April 5, 1932.  C. F. KLAGES ET AL  1,852,310
MULTIPLE GLASS CUTTING MACHINE
Filed Aug. 24, 1925  4 Sheets-Sheet 4

WITNESSES

INVENTORS.
Chester F. Klages &
Norman H. Klages.
BY
ATTORNEY

Patented Apr. 5, 1932

1,852,310

UNITED STATES PATENT OFFICE

CHESTER F. KLAGES AND NORMAN H. KLAGES, OF PITTSBURGH, PENNSYLVANIA, ASSIGNORS TO G. W. KLAGES AND SON, INCORPORATED, OF PITTSBURGH, PENNSYLVANIA, A CORPORATION OF PENNSYLVANIA

MULTIPLE GLASS CUTTING MACHINE

Application filed August 24, 1925. Serial No. 52,098.

Our invention relates to multiple glass cutting machines which are employed for cutting a number of sheets of glass from a larger sheet.

One object of our invention is to provide means for raising and lowering a carriage, upon which a plurality of glass cutting devices are mounted, relative to the table upon which the glass lays.

Another object of our invention is to provide means for maintaining both ends of the carriage moving at the same speed across the table.

Another object of our invention is to provide means for always maintaining a plurality of rails, over which the carriage travels, in the same plane with respect to each other, when the rails are raised and lowered.

A further object of our invention is to provide means for automatically raising the carriage upon its arriving at a predetermined point on the rails over which it travels.

Still another object of our invention is to provide readily accessible means for lowering the carriage with respect to the table.

Another object of our invention is to provide means for raising the carriage with respect to said table regardless of the position of the carriage upon the rails.

Another object of our invention is to provide a multiple glass cutting machine which will be relatively simple and economical of construction and positive and reliable in operation.

Briefly speaking, our invention comprises providing a plurality of levers for raising two rails over which a carriage travels in such a manner that the rails are always maintained in a horizontal position and in providing a chain mechanism for maintaining the speed of both ends of the carriage the same as it travels over a table.

For a better understanding of our invention, reference may be made to the accompanying drawings.

Figure 1:
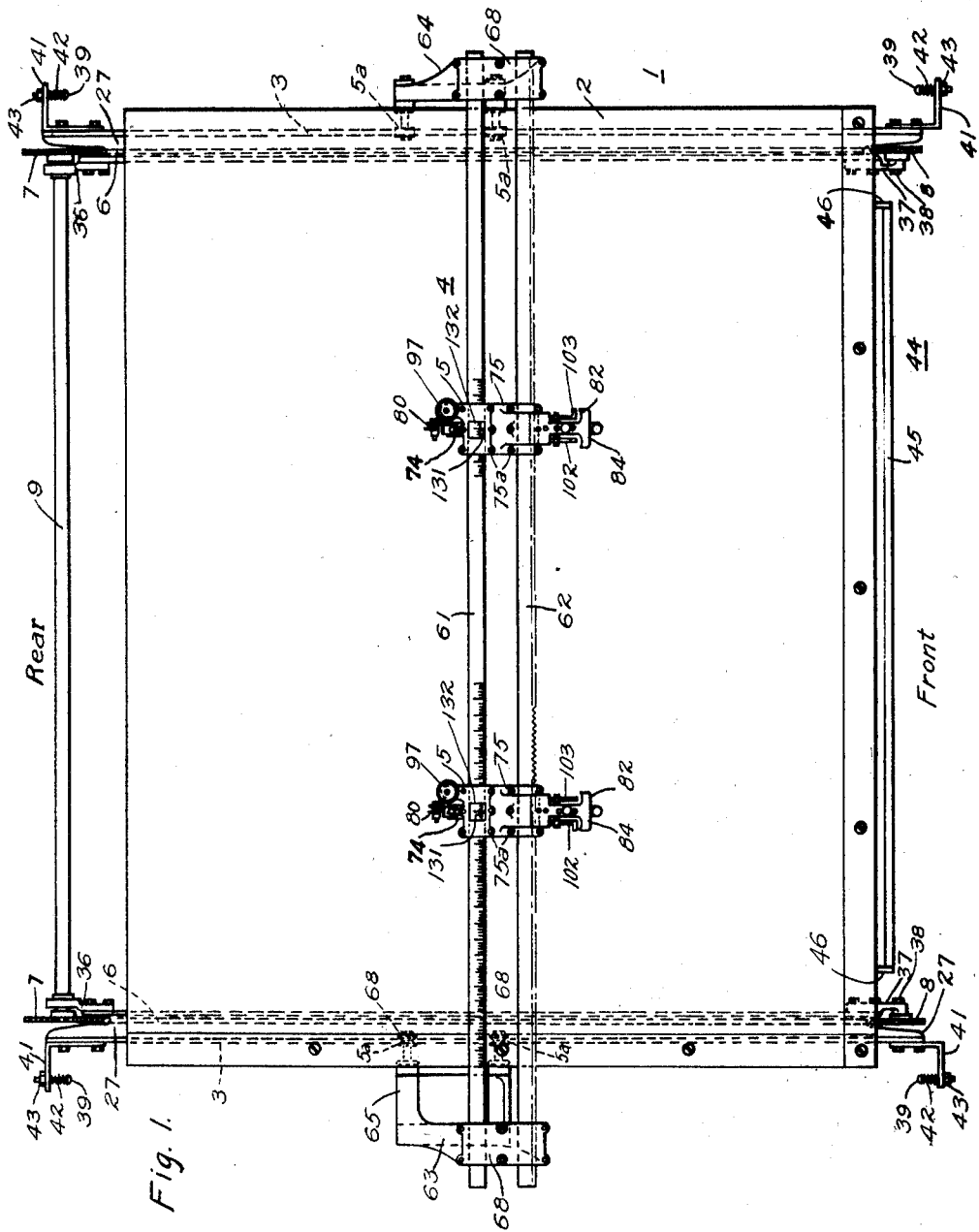
Figure 1 is a plan view of a multiple glass cutting machine constructed in accordance with our invention.

Referring particularly to Figures 1 to 4, inclusive, of the drawings, a table 1, having a wooden top 2, is provided with a plurality of rails 3 on which is movably mounted a carriage 4. The carriage 4 is provided with a plurality of rollers 5a which engage the rails 3. A plurality of cutters 5 are slidably mounted upon the carriage 4. The movement of the carriage 4 is governed by a plurality of chains 6 which are secured to said carriage and are mounted upon a plurality of sprocket wheels 7 and 8. The pair of sprocket wheels 7 are rigidly secured to a shaft 9 so the wheels 7 will rotate at the same speed.

The wooden top 2 of the table 1 is supported by four metal posts 11 which rest on the floor 12. A plurality of horizontal struts 13 are secured to the posts 11 by means of a plurality of bolts 14. A plurality of bolts 15 are employed for rigidly securing the posts 11 to the top of the table 2 and the floor 12.

Figure 2:
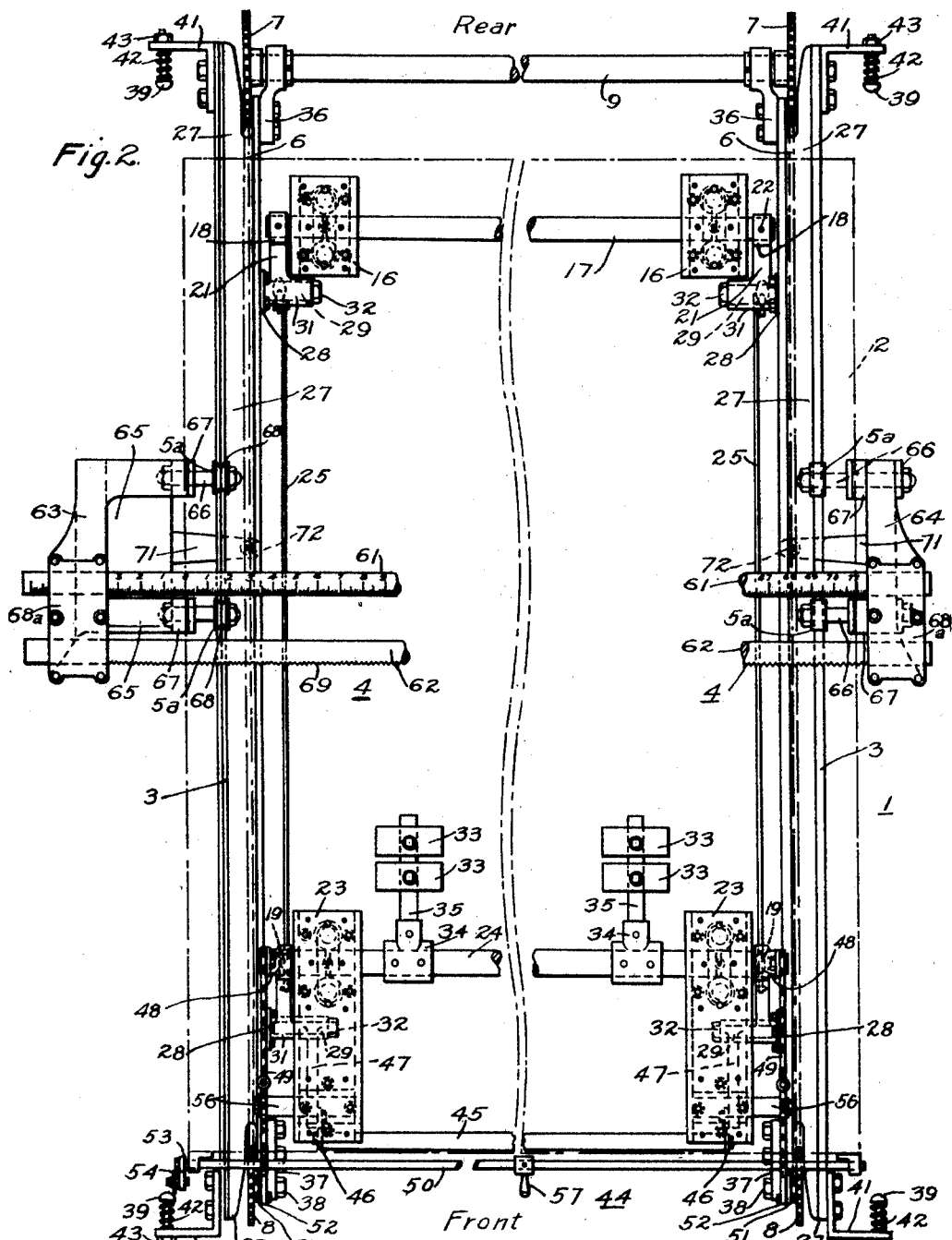
Figure 2 is a plan view of the table, illustrated in Figure 1 of the drawings, from which the entire top of the table has been removed.

The mechanism for raising and lowering the rails 3 on which the carriage 4 rides comprises a pair of brackets 16 which are securely fastened to the underside of the stationary wooden top 2 of the table 1, near the rear end thereof. A shaft 17, which is rotatably mounted in the brackets 16, is provided at each end with a metallic member 18. Each of the members 18 is provided with two integral arms or levers 19 and 21. The metallic members 18 are rigidly secured to the shaft 17 by pins 22, (Fig. 2).

A pair of brackets 23 are secured to the underside of the wooden top 2 near its front end. A shaft 24, which is rotatably mounted in the brackets 23, is provided at each end with corresponding metallic members 18. Each of the metallic members 18 is provided with a lever 19 and a lever 21, in the same manner as at the rear of the table. Each of the levers 19 which are located on the same side of the table 1 are connected by rods or bars 25. The rods 25 are pivotally secured to the levers 19 by bolts 26.

On each side of the table 1 is provided a steel beam 27 of which the corresponding rail 3 is an integral part thereof. Each of the steel beams 27 is pivotally mounted by means of brackets 28 upon those levers 21 of the metallic members 18, which are located on the same side of the table 1.

Each of the brackets 28 is provided with a threaded stud 29, which fits in a bossed portion 31 of the corresponding lever 21. A nut 32 is provided for holding the stud 29 in the lever 21.

This means of suspending the rails 3 from the top 2 of the table 1 ensures the rails 3 on each side of the table being raised and lowered at the same speed with each other, because the shafts 17 and 24 mechanically couple the levers 21 on opposite sides of the table together.

For the proper operation of the machine, it is also essential that the rails 3 are always maintained in horizontal position as they rise and fall. This result is secured by each of the levers 19 being integral with the corresponding lever 21 and the levers 19 on the same side of the table being connected one to another by a rod 25. In other words, a parallelogram is formed by the steel beams 27, the rod 25 and the oppositely disposed metallic members 18 and a second parallelogram is formed by the levers 19 forming opposite equal sides and the rod 25 and the fixed distance equal to the rod 25 between the centers of the shafts 17 and 24.

It is apparent that although each of the steel members 18 is irregular in shape, the distance between the center of the opening in boss of the lever 21 and the opening near the end of the lever 19 is constant.

A plurality of counterweights 33, each of which is rigidly secured to the shaft 24 by means of a T shaped bracket 34 (Fig. 2) and a rod 35, are employed to so urge the shaft 24 that the rails 3 will be normally actuated to their upper positions.

Figure 5:
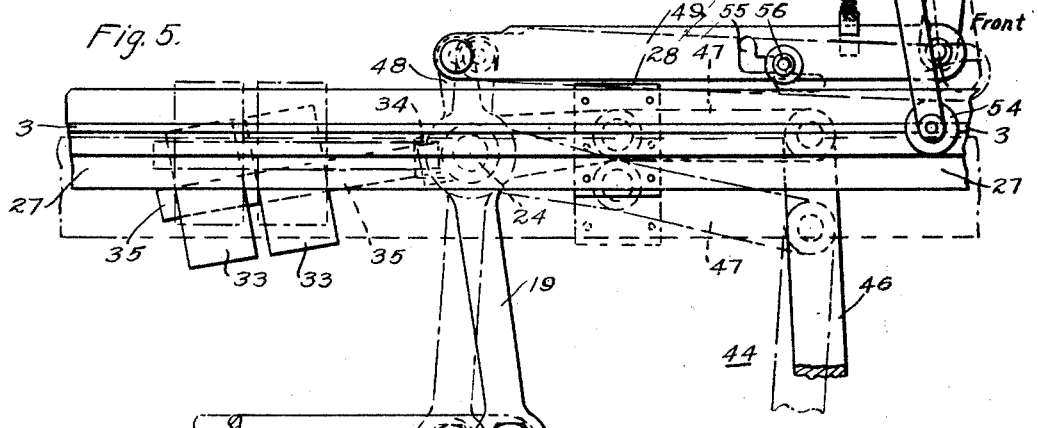
Figure 5 is a view, in side elevation, of a portion of the mechanism for raising and lowering the carriage illustrated in Figure 1 of the drawings.

Figure 5 illustrates, by solid lines, a side view of a steel beam 27 and a rail 3 secured thereto occupying their upper positions because of the action of the counter weight 33. The steel beam 27 and the rail 3 are illustrated in their lower position by broken lines.

Referring once again to the means for maintaining the speed of both ends of the carriage 4 the same in its travel over the rails 3, the shaft 9 is rotatably mounted in a plurality of brackets 36 that are bolted to the steel beam 27. Each of the sprocket wheels 8 is rotatably mounted on the corresponding steel beam 27 by means of a bracket 37 and a shaft or bolt 38. By having the sprocket wheels 7 and 8 rotatably mounted on the steel beam 27, the lengths of the chains 6 will remain constant as the carriage 4 to which they are fastened is raised and lowered.

A plurality of resiliently mounted pins 39 are employed for stopping the carriage 4 when it arrives at either end of the rails 3. Each pin 39 is slidably mounted in a bracket 41, which is bolted to the steel beam 27. A resilient member or spring 42 and a nut 43 are employed to properly position the pin 39 in the bracket 41.

Referring particularly to Figure 5 of the drawing, the means for lowering the rails 3 and locking them in position is illustrated on a somewhat larger scale. The shaft 24 is actuated by a foot operating mechanism 44 (see also Figures 2 and 3 of the drawings). This foot operating mechanism 44 comprises a horizontal rod 45 which is suspended from two vertical rods 46. The rods 46 are suspended from corresponding levers 47 which are directly connected to the shaft 24.

The method of actuating the shaft 24 to lower the rails 3 is to actuate the rod 45 downwardly by the operator applying pressure with his foot. The downward pull of the rod 45 on the vertical members 46 actuates levers 47 to rotate the shaft 24, thereby raising the counter weights 33.

Figure 3:
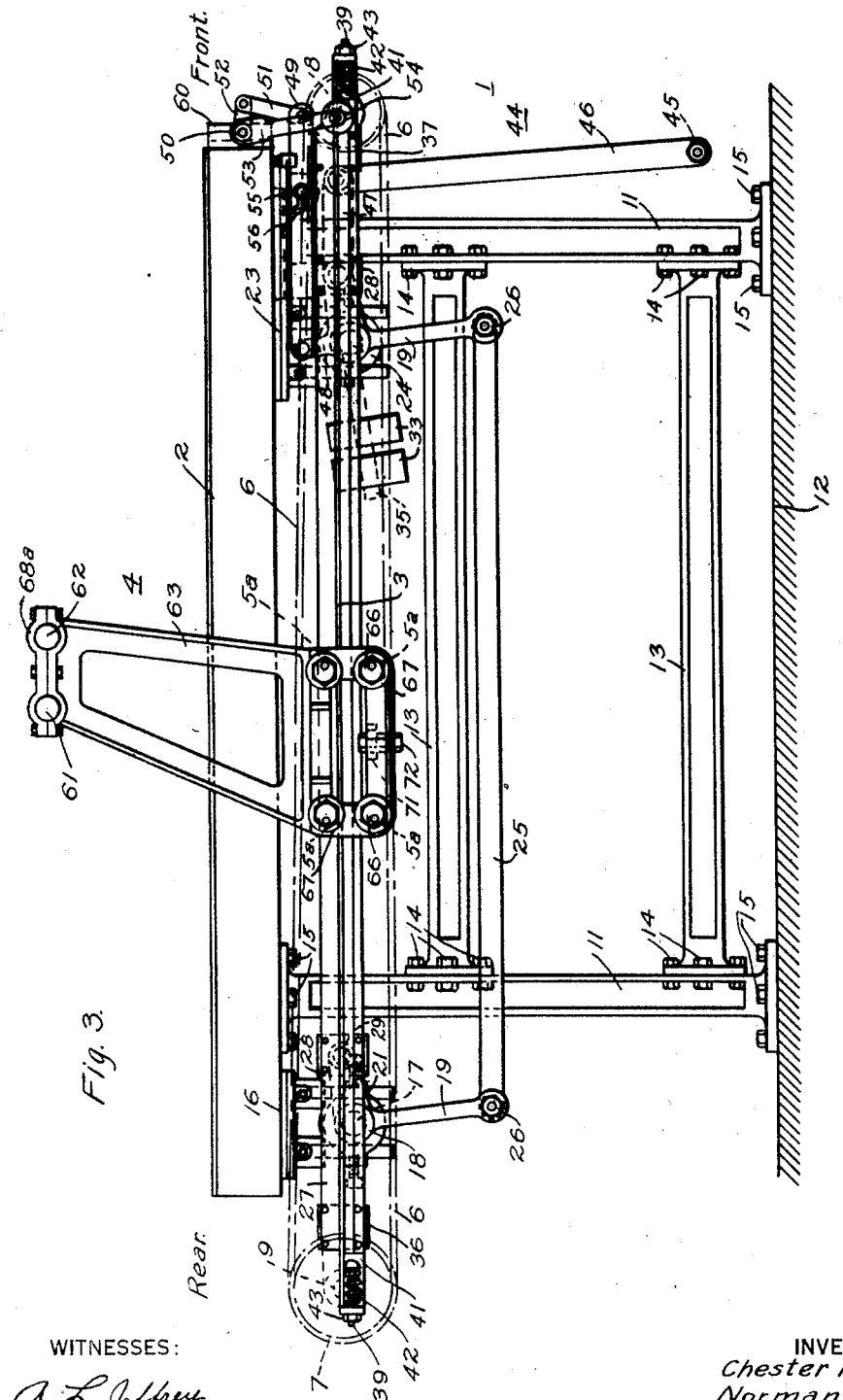
Figure 3 is a view, in side elevation, of the machine illustrated in Figure 1 of the drawings. In this view, a plurality of cutters which are mounted upon the carriage have been omitted for the sake of clearness.
Figure 4:
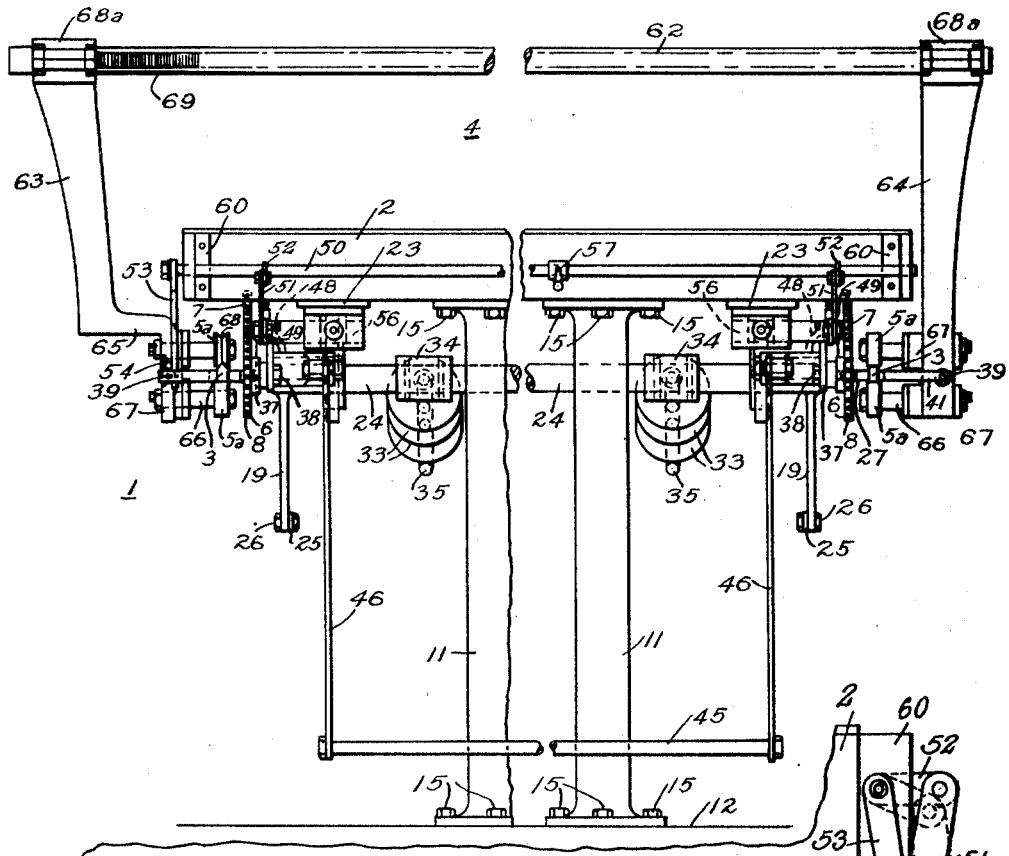
Figure 4 is a view, in front elevation, of the machine illustrated in Figure 1 of the drawings.

A latching device for locking the counter weights 33 in their raised position comprises a lever 48, which is a prolongation of the lever 19 and a bar 49, which is pivotally connected thereto at its one end (see Figs. 3 and 5). A link 51 is pivotally connected to the other end of the bar 49. A plurality of integral levers 52 and 53 are secured to a rod 50, which is pivotally mounted in a plurality of brackets 60 upon the wooden top 2 of the table 1 (see Figure 4). The lever 52 is pivotally connected to the link 51. The outer end of the lever 53 is provided with a roller 54 for engaging the carriage 4, as it arrives at the front end of the table 1. The bar 49 is provided with an L-shaped opening 55 in which a pin or stud 56 is positioned. The pins 56 is rigidly secured to the top of the table 2. The operation of the latching device takes place in the following manner.

When the carriage 4 reaches the end of its travel on the rails 3, it strikes the roller 54, thereby actuating the levers 53 and 52 in a counterclockwise direction as illustrated in Fig. 3 of the drawings. The link 51 is raised by the counterclockwise movement of the lever 52 thereby lifting the horizontal bar 49, so the pin 56 is removed from the vertical portion to the horizontal portion of the L shaped opening. The horizontal bar 49 will then be pulled to the left as the lever 48 is turned in a counterclockwise direction, thereby lowering the counter weights 33 and raising the rails 3.

The rod 50 is provided with a handle 57 to permit the operator to actuate the latching device regardless of the position of the carriage 4 on the rails 3.

Referring again to the carriage 4, it comprises two horizontal rods or bars 61 and 62, which are mounted in a plurality of brackets 63 and 64. The bracket 63 is so provided with a horizontal off set 65, that ample clearance is provided between the bracket 63 and the left side of the table 1. The purpose of this shape of the bracket 63 is to permit the ragged edge of a sheet of glass to project over the left of the table 1. A plurality of rollers 5a are mounted by means of bolts 66 and bosses 67 on the brackets 63 and 64.

Two rollers 5a are provided for each of the brackets 63 and 64 for rolling along on top of the rail 3. Two more rollers are so placed on each bracket 63 and 64 that they come in contact with the lower face of the rail 3 to prevent upward movement of the carriage 4 relative thereto. Each of the rollers 5a of the bracket 63 is provided with a grooved portion 68 for laterally positioning the roller 5a on the V-shaped top of the rail 3. A cap or plate 68a is provided for the tops of each of the brackets 63 and 64 to hold the rods 61 and 62 firmly in position.

The rod 61 is graduated in feet and inches, so that the cutters 5 may be positioned thereon as desired by the operator. The rod 62 is provided with a plurality of teeth (8 to the inch) to definitely position the cutters 5 in a manner hereinafter more fully described. Each of the brackets 63 is provided with a flange or projection 71 (Fig. 2) which projects inwardly toward the center of the table 1. The ends of the chain 6 are secured to the corresponding flange 71 by means of a bolt 72.

Each of the cutters 5 comprises two body members 74 and 75, (see Fig. 7) which are adapted to fit around the rods 61 and 62 of the carriage 4 upon which each cutter 5 is slidably mounted and said members are securely fastened one to another by a plurality of bolts 75a (see Figure 1 of the drawings).

A detailed description of one of the cutters 5 is given in each of the copending divisional applications of which this is the original application. The divisional applications were filed on April 3rd, 1929, and bear Serials Nos. 352,211 and 353,212.

However it may be stated for a clear understanding of this application that each cutter 5 is provided with a cutting tool 80 which is mounted in the lower body portion 74 and that a handle 84, which forms an integral part of the upper body portion 75, is provided for actuating the cutter 5.

An oil cup 97 is securely mounted on the lower body portion 74 of the cutter 5.

The cutter 5 is provided with a plurality of plungers 102 and 103 for engaging the teeth of the horizontal bar or rock member 62 of the carriage 4.

The plungers 102 and 103 are spaced apart a distance of one and nine sixteenth inches. When it is desired to set the cutter 5 at an eighth division on the carriage 4, the plunger 103 is employed to lock the cutter 5 in position. The other plunger 102 is employed for setting the cutter 5 in any one of the odd sixteenth positions on the scale of the carriage 4. It is readily apparent that the point of the plunger 102 can not fit in the indentation between the teeth of the bar 62, when the plunger 103 occupies its operative position as illustrated in the drawings. It is equally apparent that the plunger 103 can not occupy its operative position between the teeth of the rod 62 at the same time the plunger 102 occupies its operating position between the teeth of the rod 62.

By this arrangement of plungers or locking devices, it is possible for the operator to set quickly the reference mark 131 provided adjacent to the hole 132 in the upper body portion 75 of the cutter 5 on any division of the scale on the rod 61 of the carriage 4. This reference mark 131 is positioned in a predetermined relation to the plungers 102 and 103 of the cutter 5. The cutting tool 80 is provided with a diamond (not illustrated) for cutting glass.

The operation of our invention is as follows: The cutters 5 are set in predetermined position upon the rods 61 and 62 of the carriage 4. Each of the cutters 5 is positioned to the nearest odd sixteenth of an inch by means of the plunger 102 or to the nearest eighth of an inch by means of the plunger 103. The diamond in the cutting tool 80 has already been adjusted to a predetermined position with relation to the reference mark on the cutter 5.

The carriage 4 is then actuated to the rear of the table 1 and a sheet of glass is then placed upon the wooden top 2 thereof. It is to be understood that the carriage 4 occupies its upper or inoperative position in its movement toward the rear of the table 1.

The operator applies pressure with his foot upon the rod 45 to lower the carriage 4 and lift the counter weights 33, until the bar 49 of the latching device locks the counter weights 33 in position.

The carriage 4 is then drawn at a moderate speed toward the operator.

The lines cut by the diamonds upon the glass are parallel with one another because the cutters 5 are rigidly secured to the carriage 4 and because of the even movement of both ends of the carriage 4 in the rails 3. When the carriage 4 reaches the end of its travel, it will strike the roller 54 thereby actuating the lever 53 to raise the horizontal bar 49.

When the bar 49 is raised to its upper position, the counter weights 33 actuate the levers 21 to raise the steel beams 27, thereby lifting the carriage 4 with respect to the top 2 of the table 1. The carriage 4 is then actuated to the rear of the table 2. After they have been broken off, the smaller sheets of glass are then removed from the table and a larger sheet of glass is placed thereon.

In case it is desired to raise the carriage 4 with respect to the top 2 of the table 1, when the carriage 4 is in an intermediate position on the rails 3, all that is necessary is to actuate the handle 57, thereby causing the rod to turn the lever 52 to lift the horizontal rod 49 to permit the downward movement of the counter weight 33.

While we have shown our invention in its preferred form, it is apparent that minor modifications may be made in the construction of the table without departing from the spirit of our invention. We desire, therefore, to be limited only by the scope of the appended claims.

We claim:

1. In a glass cutting machine, the combination with a table, of a plurality of cutters, a carriage for supporting said cutters, a plurality of rails, rollers on said carriage for movably mounting said carriage upon said rails for effecting movement of said carriage across said table and means comprising two pair of mechanically coupled L-shaped levers pivotally mounted upon said table and attached to said rails for moving said rails perpendicular with respect to said table.

2. In a glass cutting machine, the combination with a table having a surface, of a plurality of cutters, a carriage for supporting said cutters, a plurality of rails for supporting said carriage, a pair of L shaped levers pivotally mounted at opposite ends of said table for supporting said rails, and means comprising a rod pivotally connected to one lever of each pair of levers for moving said rails relative to said table and for maintaining said rails parallel to the surface of said table.

3. In a glass cutting machine, the combination with a table, of a plurality of cutters, a carriage for supporting said cutters, a plurality of rails for supporting said carriage, a plurality of levers pivotally secured to said table and said rails, means comprising a plurality of rods attached to said levers and parallel to said rails for maintaining the angular relation of said levers with respect to one another constant, and means for actuating said levers.

4. In a glass cutting machine, the combination with a table, of a plurality of cutters, a carriage for supporting said cutters, a plurality of rails for supporting said carriage, said rails having a lower and an upper position, a plurality of levers pivotally secured to said table and to said rails, means comprising a plurality of rods attached to said levers for maintaining the angular relation of said levers with respect one to another constant, a counter weight for biasing said lever and rails in their upper position and means for actuating said levers and rails to their lower position whereby the cutters are brought into cutting relation to a sheet of glass on said table.

5. In a glass cutting machine, the combination with a table, of a plurality of cutters, a carriage for supporting said cutters, means for raising and lowering said carriage and maintaining said carriage constantly parallel with its former positions as it is moved across said table, and means for actuating said first means upon said carriage occupying a predetermined horizontal position with respect to said table.

6. In a glass cutting machine, the combination with a table, of a plurality of cutters, a carriage for supporting said cutters, means for raising and lowering said carriage, and means governed by the horizontal position of said carriage for governing said first means.

7. In a glass cutting machine, the combination with a table, of a plurality of cutters, a carriage for supporting said cutters, a plurality of rails for supporting said carriage, means for raising and lowering said rails, and means governed by the position of said carriage upon said rails for governing said first means.

8. In a glass cutting machine, the combination with a table, of a plurality of cutters, a carriage for supporting said cutters, a plurality of rails for supporting said carriage, means comprising a plurality of levers for raising and lowering said rails with respect to said table, a counter weight for actuating said levers to lower said rails, and locking means governed by the horizontal travel of said carriage upon said rails for holding said rails in their lower position.

9. In a glass cutting machine, the combination with a table, of a plurality of cutters, a carriage for supporting said cutters, a plurality of rails for supporting said carriage and for raising and lowering it, means comprising a plurality of levers for raising and lowering said rails with respect to said table, a counter weight for actuating said levers to raise said rails, means for actuating said levers to lower said rails, a latching device for holding said rails in their lower position, said latching device being actuated by said carriage upon the carriage arriving at a predetermined position upon said rails.

10. In a glass cutting machine, the combination with a table, of a plurality of cutters, a carriage for supporting said cutters over and adjacent said table and adapted to occupy a plurality of positions, means for raising and lowering said carriage with respect to said table and means mounted upon said raising and lowering means comprising two pairs of rigidly connected sprocket wheels and chains for maintaining the movement of said carriage always parallel to itself in the travel of said carriage across said table.

11. In a glass cutting machine, the combination with a table, of a plurality of cutters, a carriage for supporting said cutters, a plurality of rails for supporting said carriage, a plurality of pivotally mounted levers for supporting said rails, means comprising additional levers for maintaining the angular movement of said first levers in the same relation with respect to one another, a counter weight to actuate said levers to lift said carriage with respect to said table and body-operated means for lowering said carriage with respect to said table.

12. In a glass cutting machine, the combination with a table, of a plurality of cutters, a carriage for supporting said cutters, a plurality of rails for supporting said carriage, a plurality of pivotally mounted levers for supporting said rails, means comprising additional levers for maintaining the angular movement of said first levers in the same relation with respect to one another, a counter weight to actuate said levers to lift said carriage with respect to said table, means for actuating said lever to lower said carriage with respect to said table, a shaft rotatably mounted upon said means, a plurality of sprocket wheels mechanically connected to said shaft, and a plurality of chains secured to said carriage and mounted over said sprocket wheels.

In testimony whereof, we have hereunto subscribed our names this 21st day of August, 1925.

CHESTER F. KLAGES.
NORMAN H. KLAGES.